Dec. 22, 1970     G. V. WOODLING     3,549,283
AXIAL LIMIT MEANS FOR MALE AND FEMALE SPLINE
TEETH IN A FLUID PRESSURE DEVICE
Filed Feb. 18, 1969

INVENTOR
GEORGE V. WOODLING
BY
Woodling, Krost, Granger and Rust
attys

United States Patent Office 3,549,283
Patented Dec. 22, 1970

3,549,283
AXIAL LIMIT MEANS FOR MALE AND FEMALE
SPLINE TEETH IN A FLUID PRESSURE DEVICE
George V. Woodling, 22077 W. Lake Road,
Rocky River, Ohio 44116
Filed Feb. 18, 1969, Ser. No. 800,124
Int. Cl. F01c 1/10
U.S. Cl. 418—61   4 Claims

ABSTRACT OF THE DISCLOSURE

The fluid pressure device includes a stator-rotor mechanism and the axial limit means is especially adapted to limit the relative axial movement between male and female spline teeth which operate as connection means between an orbital shaft and rotor means in the stator-rotor mechanism. The axial limit means includes a side member held in facing relation to a side of said stator-rotor mechanism and disposed to sealingly engage a side of said rotor means. The side member includes inner aperture wall means constituting a shaft opening through which said orbital shaft extends. The orbital shaft and the inner aperture wall means have interengagement wall means axially abutting each other and limiting the relative axial movement between said male and female spline teeth.

BACKGROUND OF THE INVENTION

In a fluid pressure device embodying a stator-rotor mechanism, having stator and rotor means, an orbital shaft is disposed for operative connection to the rotor means. The operative connection comprises male spline teeth on the orbital shaft which fit within female spline teeth provided in the rotor means. Relative axial movement may occur between the male and female spline teeth and interfere with the operation of the fluid pressure device.

Accordingly, it is an object of my invention to limit the extent that the male and female spline teeth may move axially relative to each other.

Another object is the provision of axial limit means which utilizes the orbital movement of the orbital shaft to an advantage.

Another object is the provision of axial limit means which does not obstruct the normal assembly of the orbital shaft.

SUMMARY OF THE INVENTION

The invention constitutes axial limit means for male and female spline teeth which operate as connection means between an orbital shaft and rotor means in a fluid stator-rotor mechanism, said axial limit means limiting the extent that said male and female teeth may axially move relative to each other and comprising side member means held in facing relation to a side of said stator-rotor mechanism and sealingly engaging a side of said rotor means, said side member means including inner aperture wall means constituting a shaft opening having a reference axis, said orbital shaft having at least a first shaft portion extending through said shaft opening, said first shaft portion having a rotational movement about its own shaft axis and an orbital movement about said reference axis of said shaft opening, said first shaft portion and said inner aperture wall means having interengagement wall means axially abutting each other and limiting the relative axial movement between said male and female spline teeth.

Other objects and a fuller understanding of this invention may be had by referring to the following description and claims, taken in conjunction with the accompanying drawings, in which:

Figure 1:
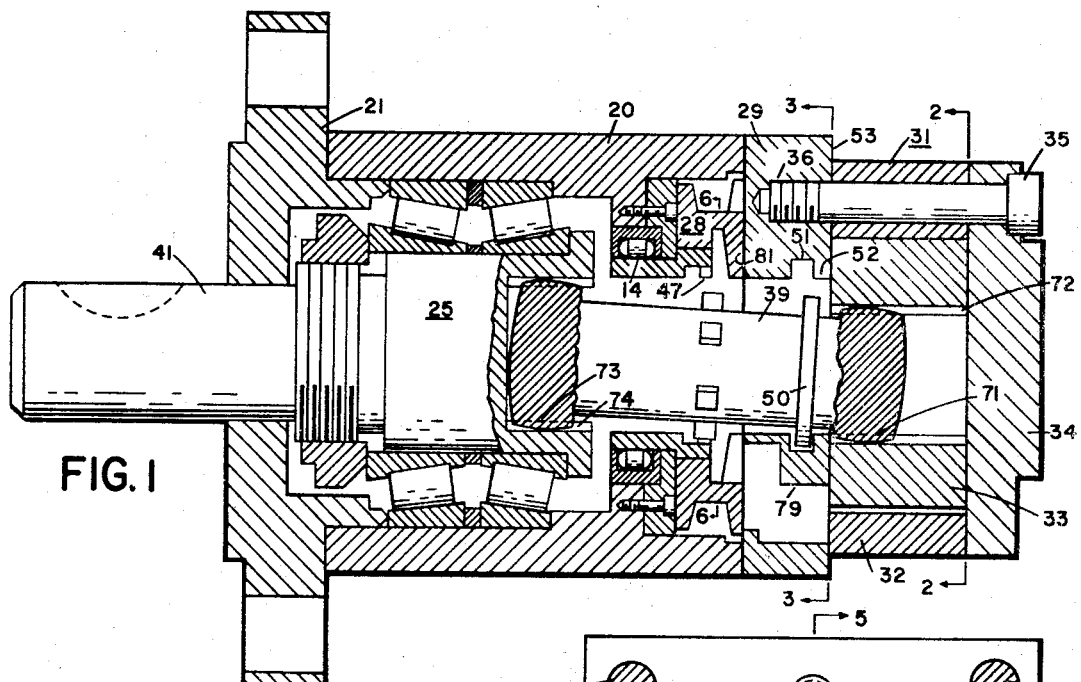
FIG. 1 is an elongated view, partly in section, of an orbital fluid pressure device embodying the features of my invention.
Figure 2:
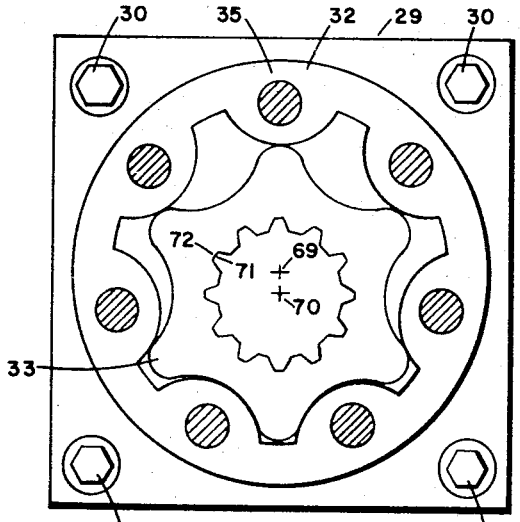
FIG. 2 is a view taken along the line 2—2 of FIG. 1 under the end cap, showing the stator-rotor mechanism.
Figure 3:
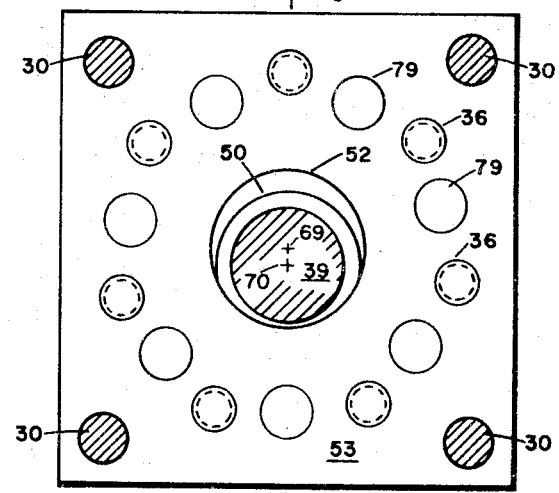
FIG. 3 is a view taken along the line 3—3 of FIG. 1, showing the stator-rotor side of a stationary valve member, the orbital shaft being shown in section.
Figure 5:
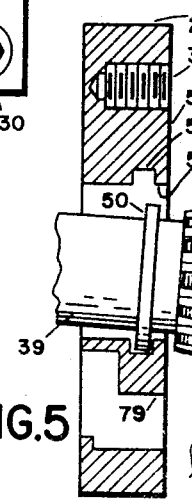
Figure 6:
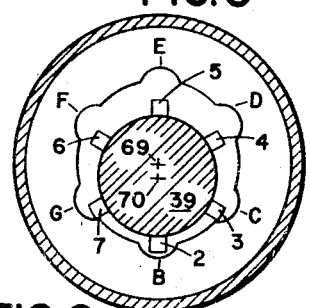

FIG. 5 is a cross-sectional view taken along the line 5—5 of FIG. 3, showing the right-hand end portion of the orbital shaft orbitally disposed in a centrally disposed shaft opening in the stationary valve member; and FIG. 6 is a view looking at the right-hand side of the drive means between the orbital shaft and the rotary valve in FIG. 1, taken along the line 6—6 thereof, showing six regional drive locations.

DESCRIPTION OF THE PREFERRED EMBODIMENT

The figures of the drawing show a preferred embodiment of the invention but this is only by way of illustration; it is not to be taken as limiting, the invention being limited only by the hereinafter appended claims.

With reference to the drawings, the construction of my orbital fluid pressure device comprises generally a main housing 20 having substantially a square cross-section. A mounting flange 21 is secured to the left-hand end of the housing. The housing 20 is hollow from end-to-end. Rotatively mounted in the left-hand end portion of the housing is a main shaft 25 having an axis substantially coinciding with the fixed axis. As illustrated, the main shaft 25 is rotatively mounted in tapered roller bearings. An external shaft 41 comprises an integral part of the main shaft 25. A rotary valve 28, rotatively mounted on bearings 14 is mounted in the right hand end portion of the main housing 20 and sealingly engages a stationary face 81 of a stationary valve member 29 connected to the right-hand end face of the main housing by screws 30. Attached to the right-hand face 53 of the stationary valve member 29, is a stator-rotor mechanism 31 comprising stator means 32 and rotor means 33. An end cap 34 encloses the stator-rotor mechanism. As illustrated, screws 35 secure the stator-rotor mechanism and the end cap 34 to the stationary valve member 29. The screws 35 threadably engage threaded holes 36 in the stationary valve member. Although not limited thereto, the stator has seven internal teeth and the rotor has six external teeth intermeshing with the stator internal teeth. The stator may be described as having (n) number of internal teeth and the rotor may be described as having (n−1) number of external teeth. The intermeshing teeth upon relative movement therebetween define operating fluid chambers. The rotor has an axis 70 which orbits about the fixed axis 69 of the stator. The rotor 33 also rotates about its own axis. The stator internal teeth constitute outer wall means of the operating fluid chambers. The rotor external teeth constitute inner wall means of the operating fluid chambers. The rotation of the rotary valve 28 relative to the stationary valve 29 controls the entrance of fluid to and the exit of fluid from the operating fluid chambers through fluid passages 79 in the stationary valve member 29. The rotory valve 28 is driven by a wobble or orbital shaft 39 which also interconnects the main shaft 25 and the rotor 33. As shown in FIG. 1, the right hand end portion of the wobble shaft 39 extends through a shaft hole 52 in the stationary valve member 29 and has an operative connection with the rotor 33. The shaft hole 52 has a reference axis substantially in axial alignment with the fixed axis of the stator. Thus, the axis of the wobble shaft 39 orbits around the reference axis, the same as the rotor axis orbits around the stator axis. The operative connection comprises male spline teeth 71 on the wobble shaft which interfittingly engage female spline teeth 72 in the rotor. Thus, the right-hand end portion of the wobble shaft 39 is disposed for rotational movement about its own axis and for orbital movement about the fixed axis of the stator. The connection means between the left-hand end portion of the wobble shaft and the main shaft 25 comprises male spline teeth 73 on the wobble shaft which interfittingly engage female spline teeth 74 in the central core of the main shaft. Thus, the left-hand end portion of the wobble shaft is disposed for rotational movement only about the fixed axis of the stator.

The wobble shaft 39 is connected to drive the rotary valve 28 through one rotation for each rotation of the wobble shaft. The drive is shown in FIG. 6 and may be substantially the same as that shown and described in FIGS. 16–18 in my pending application, Ser. No. 797,223, filed Feb. 6, 1969. The drive means comprises a plurality of drive follower means B to G disposed at circumferentially spaced regional locations internally of the rotary valve and a plurality of drive actuating means 2 to 7 circumferentially disposed about the orbital shaft 39. The drive follower means B to G are circumferentially disposed with reference to the first axis about which the rotary valve rotates and the drive actuating means 2 to 7 are circumferentially disposed with reference to the shaft (second) axis. The drive follower means B to G comprise female wall means in the form of substantially a semicircle provided in an internal rim 47 within the rotary valve. The drive actuating means 2 to 7 comprise male wall means in the form of lugs provided on the outside of the actuating shaft. The diameter of the top of the lugs may be substantially the same as the diameter of the male gear teeth 71 and 73, whereby the lugs as well as the male gear teeth may pass through the central opening in the stationary valve and in the rotary valve. The female wall means and the male wall means are preferably six in number, being the same in number as the external teeth of the rotor 33 and may be designated as (n—1) in number. The female wall means are circumferentially spaced apart from each other at substantially equal intervals (sixty degrees) about the first axis and the male wall means are circumferentially spaced apart from each other at substantially equal intervals (sixty degrees) about the shaft (second) axis. The drive actuating means 2 to 7 (male wall means) and the drive follower means B to G (female wall means) respectively engage each other in successive order at the regional locations with the respective drive means at each regional location constituting a pair of regional drive means for transmitting a torque therebetween in response to the combined movement of the orbital shaft 39.

The drive means thus described constitutes universal drive means and provides for rotating the rotary valve means relative to the stationary valve means once for each rotation of the wobble shaft 39. The operation of the rotary valve means is independent of the load and thrust on the main shaft. The fluid may flow through the drive means as open spaces are needed to accommodate for the flow of fluid therethrough.

Figure 4:
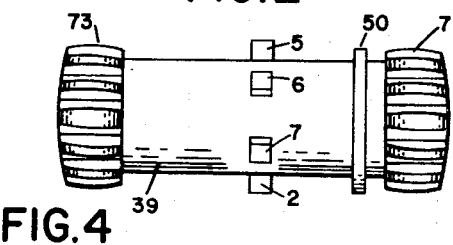
FIG. 4 is a side view of the orbital shaft and shows an annular shoulder thereon which comprises one part of the axial limit means.

Relative axial movement may occur between the male and female spline teeth connections, and in this invention, confinement or axial limit means are provided to limit such relative axial movement. In FIGS. 4 and 5, the confinement means comprises abutment means in the form of an annular shoulder 50 on the wobble shaft 39 which is disposed to orbitally fit within an annular recess 51 provided inside of a centrally disposed shaft hole 52 in the stationary valve member 29, see FIG. 5. The interengagement between the side walls of the shoulder 50 and the side walls of the recess 51 limits the relative axial movement between the male and female spline teeth.

The orbital shaft 39 may be inserted in the hole 52 of the rotary valve 29 in the normal manner without any obstruction from the annular shoulder 50, since its outside diameter is less than the diameter of the hole 52. It is the orbital position of the rotor means 33 which holds the annular shoulder 50 within the recess 51. There is always at least some portion of the annular shoulder 50 engaging a side wall of the recess 51. This interengagement of the side walls limits the extent that the orbital shaft may move in an axial direction and makes it possible to interchange stator-rotor mechanism of variable width. Thus, if it were not for my axial limit means, it would be possible for the orbital shaft 39 to work its way to the right in FIG. 1 until it hit the end cap 34, thereby causing the male and female spline teeth 73 and 74 to lose their full engagement width for transmitting full torque to the main shaft 25.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. Axial limit means for male and female spline teeth which operate as connection means between an orbital shaft and rotor means in a fluid stator-rotor mechanism, said axial limit means limiting the extent that said male and female teeth may axially move relative to each other and comprising side member means held in facing relation to a side of said stator-rotor mechanism and sealingly engaging a side of said rotor means, said side member means including inner aperture wall means constituting a shaft opening having a reference axis, said orbital shaft having at least a first shaft portion extending through said shaft opening, said first shaft portion having a rotational movement about its own shaft axis and an orbital movement about said reference axis of said shaft opening, said first shaft portion and said inner aperture wall means having interengagement wall means axially abutting each other and limiting the relative axial movement between said male and female spline teeth.

2. The structure of claim 1, wherein said side member means has laterally extending wall means and wherein said first shaft portion has abutment means extending outwardly therefrom and engageable with said laterally extending wall means to limit relative axial movement between said efmale and male spline teeth.

3. The structure of claim 1, wherein said side member means has inner annular recess means having opposed laterally extending wall means and wherein said first shaft portion has abutment means extending outwardly therefrom and engageable with at least one of said opposed laterally extending wall means to limit relative axial movement between said female and male spline teeth.

4. The structure of claim 1, having a main shaft provided with female spline teeth, said orbital shaft having a second shaft portion provided with male spline teeth fitting within said female spline teeth in said main shaft.

References Cited

UNITED STATES PATENTS

| 3,270,681 | 9/1966 | Charlson | 103—130 |
| 3,405,603 | 10/1968 | Woodling | 103—130X |
| 3,452,543 | 7/1969 | Goff et al. | 91—56X |

EVERETTE A. POWELL, JR., Primary Examiner